United States Patent [19]
Fisher et al.

[11] Patent Number: 5,326,266
[45] Date of Patent: Jul. 5, 1994

[54] AREA OF INTEREST DISPLAY SYSTEM WITH OPTO/MECHANICAL IMAGE COMBINING

[75] Inventors: Ralph W. Fisher, Park City; Jim Austin, American Fork, both of Utah

[73] Assignee: Evans & Sutherland Computer Corporation, Salt Lake City, Utah

[21] Appl. No.: 939,013

[22] Filed: Sep. 2, 1992

[51] Int. Cl.$^5$ .................................................. G09B 9/32
[52] U.S. Cl. ..................................... 434/44; 353/48; 353/50
[58] Field of Search ..................... 434/29, 30, 38, 44; 353/46, 48, 50

[56] References Cited

U.S. PATENT DOCUMENTS

| | | | |
|---|---|---|---|
| 1,702,195 | 2/1929 | Centeno | 353/50 X |
| 4,348,186 | 9/1982 | Harvey et al. | 434/44 |
| 4,634,384 | 1/1987 | Neves et al. | 434/44 |
| 5,136,675 | 8/1992 | Hodson | 434/44 X |
| 5,142,788 | 9/1992 | Willetts | 353/50 X |
| 5,242,306 | 9/1993 | Fisher | 434/44 |

Primary Examiner—Gene Mancene
Assistant Examiner—Jeffrey A. Smith

[57] ABSTRACT

In an area of interest (AOI) display, a detailed image is projected on a screen at the area of interest while a background image is projected on the surrounding area such that the boarder between the two areas varies in an orbital oscillating pattern to accomplish visual blending. A combiner includes a transparent portion to accommodate projection of the background image at the area of interest. The opaque portion carries a mirror to reflect the detailed image filling the area of interest. The combiner is oscillated in an orbital pattern at a resonant frequency, e.g. 210 Hertz by a three phase electromechanical drive unit.

9 Claims, 3 Drawing Sheets

AREA OF INTEREST DISPLAY SYSTEM WITH OPTO/MECHANICAL IMAGE COMBINING

BACKGROUND OF THE INVENTION

1. Field of the Invention

This invention relates to computer graphics systems and more specifically to area of interest display systems as for use in training simulators.

2. Discussion of the Prior Art

Area of interest (AOI) display systems are well known in the prior art as disclosed, for example, in U.S. Pat. No. 4,348,186, Harvey et al. and also in U.S. Pat. No. 4,634,384, Neves et al. Essentially, the systems combine and blend a high resolution, small field of view image (inset) with a wide field, low resolution image (background). For example, a trainee, seated in a flight simulator sees a wide field of view display to simulate the view of an actual flight pattern. Consequently, a trainee can experience specific flight routes or patterns with considerable realism while seated in a training simulator.

It has been recognized in the past that as a result of limitations in human visual perception a considerable portion of a wide field of vision display may be of relatively poor quality and still attain substantial realism. The key is to inset a high resolution image in the low resolution background image at the viewer's area of interest. As recognized in the past, such AOI systems take advantage of the fact that the high resolution viewing area of the eye (fovea) is relatively small. Specifically, as the fovea of a normal eye subtends an angle only of about two degrees, the high resolution inset image can be relatively small in relation to the low resolution background or panoramic image.

A previously recognized problem in producing area of interest displays has been avoiding visible effects at the border between the two images. Considerable effort has been expended attempting to avoid incongruities at the transition from the high resolution image to the low resolution image that are disturbing to the viewer. For example, the problem was recognized and considered in U.S. Pat. No. 4,634,384, "Head and/or Eye Tracked Optically Blended Display System", Neves et al.

Although various solutions have been proposed to accomplish a visually acceptable transition between the images in an AOI display, a need exists for an economical and effective process and apparatus to accomplish that end. In that regard, it is desirable to avoid the need for high precision optical alignment, exotic filtering or video systems requiring extensive hardware or critical operating requirements. In a related context, it is noteworthy that techniques involve substantial problems in attaining optical masks using proper sizing and proper optical density falloff. In that regard, alignment problems can be reduced by using a mirror image-combining structure. However, another problem is introduced because no technique is known to grade the reflectance of the mirror edge so that it gives equal optical control in both transmission for the background and reflectance for the inset. Such control is required for smooth blending at the boundary. Thus, the continuing nee, d exists for an improved system to solve the problem.

SUMMARY OF THE INVENTION

In general, the present invention effectively combines inset and background images by displacing the relative areas of projection in a vibrating orbital pattern. That is, the images are opto/mechanically combined using a hard edge mirror that is orbited in its plane at a high frequency to accomplish a blended transition. The visual result is an effectively blended region defined only by amplitude of the vibration.

In accordance with the disclosed embodiment, the background image is static while the projected area of the inset image oscillates to vary the boundary in an orbital pattern. As disclosed, a mechanical support assures in-plane motion of the mirror driven by a three-phase power source. Generally, it has been found desirable to drive the mirror at a relatively high frequency, e.g. 210 Hertz in the disclosed embodiment. Also, as disclosed, techniques are provided to diminish drive power requirements by using a mechanically resonant system.

BRIEF DESCRIPTION OF THE DRAWINGS

In the drawings, which constitute a part of this specification, exemplary embodiments exhibiting various objectives and features hereof are set forth, specifically.

DESCRIPTION OF THE DETAILED EMBODIMENT

A detailed illustrative embodiment of the present invention is disclosed herein; however, it is merely representative, recognizing that a wide variety of specific embodiments of the disclosed system are possible. Nevertheless, the illustrative embodiment is deemed to afford the best embodiment for purposes of disclosure and to provide a basis for the claims herein which define the scope of the present invention.

Figure 1:
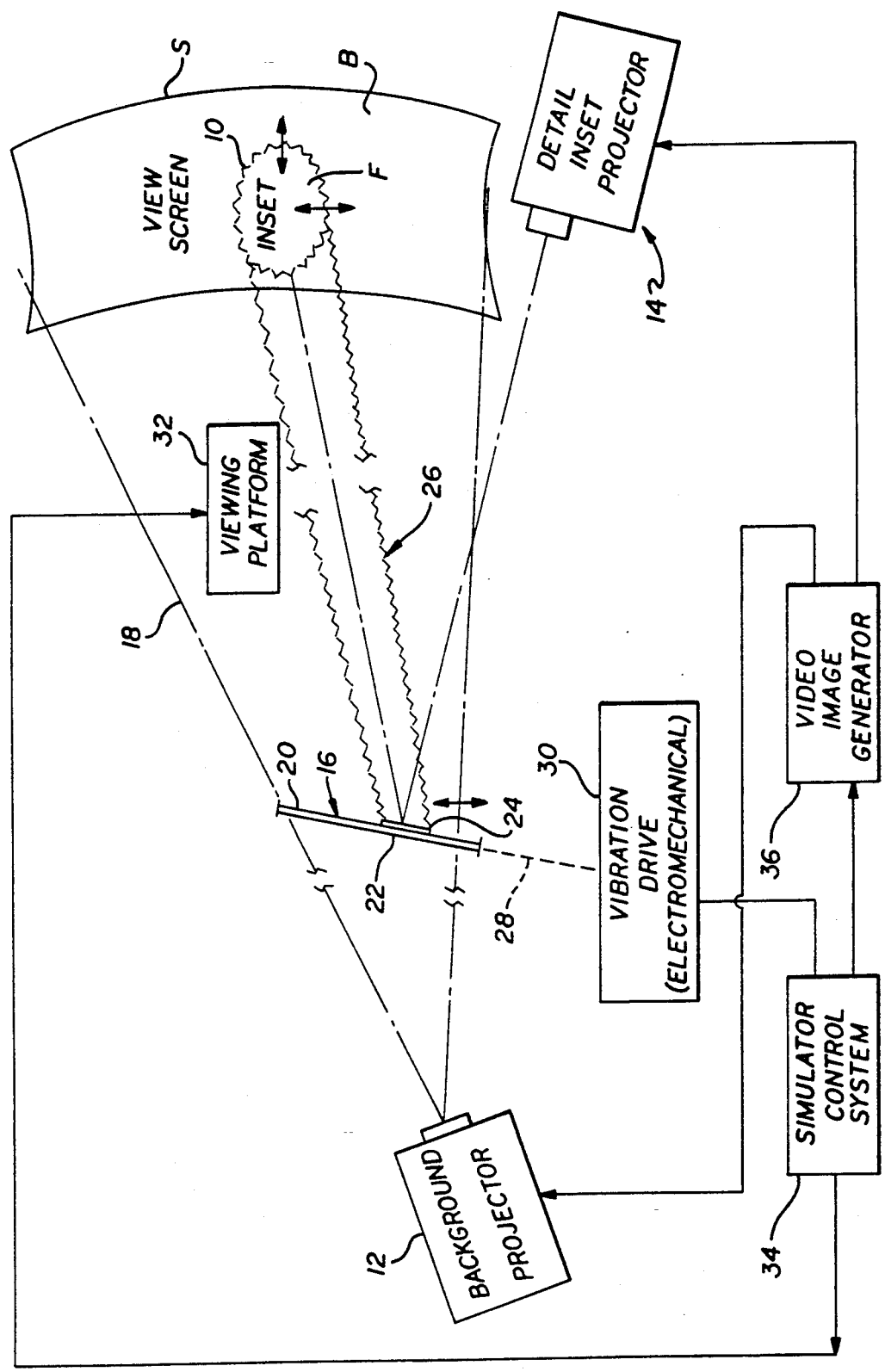
FIG. 1 is a perspective and diagrammatic view of a system in accordance with the present invention.

As disclosed in detail below, the system projects a composite, dynamic picture (not represented) on a view screen S (FIG. 1, upper right). While details of the picture are not illustrated, a wide field, low resolution, background image area B is indicated surrounding the high resolution inset area F. As disclosed in detail below, the inset area F moves relative to the background area B in an orbital pattern to effectively blend the background and inset images as a composite picture. Note that the inset image contained in the area F does not move in relation to the background image. Rather, to repeat for emphasis, while the picture images are steady, the display area F of the inset image moves in an orbital pattern of small displacement varying the boundary. Thus, a component of the picture centered in the inset area F remains fixed; however, at the periphery of the inset area F, the inset area orbits the boundary to variously encroach the background area B.

The oscillatory motion of the projected area (not the image) is represented in FIG. 1 by a jagged line 10 between the background area B and the inset area F. The oscillating or vibrating displacement between the inset area F and the background area B effectively blends the two projected images for the human eye, providing the motion exceeds a somewhat minimal frequency. For example, in one embodiment, a vibration frequency of 210 Hertz has been found to be effective. Generally, frequencies of less than 200 Hertz are somewhat ineffective.

Figure 2A:
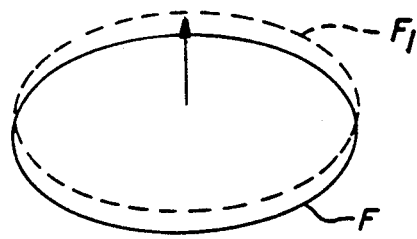
FIGS. 2a, 2b, and 2c are diagrammatic views in timed sequence illustrating an operating aspect of the system of FIG. 1.
Figure 2B:
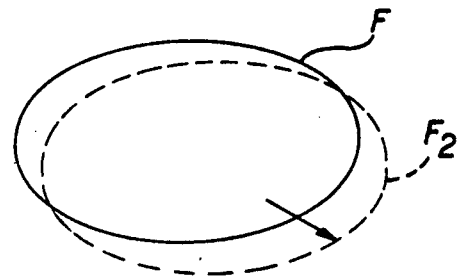
Figure 2C:
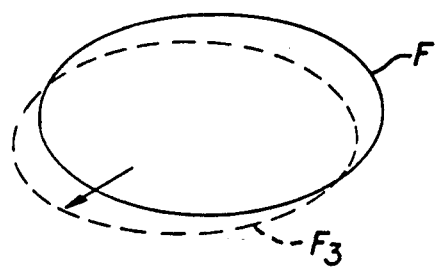

The oscillatory displacement of the inset area F will now be considered in somewhat greater detail with reference to FIG. 2. The top-center offset position of the area F is illustrated in FIG. 2a. That is, the solid line area F indicates the centered location, while the dashed line indication F1, F2 and F3 (FIGS. 2a 2b and 2c, respectively) indicate 120 degree displacements.

When the system is in operation, the area F is displaced in a vibrating orbital pattern moving in sequence respectively to the dashed line indications F1, F2 and F3 in FIGS. 2a, 2b, and 2c. Note that while the representations of FIG. 2 are not to scale, they illustrate three instants of the orbital displacement pattern in time sequence. Specifically, FIG. 2a shows the inset area F1 displaced upwardly and centered. FIG. 2b illustrates the inset area F2 displaced some 120 degrees to the lower right as it would be an instant later. After still another instant, the inset area F3 is shown displaced another 120 degrees to the lower left in FIG. 2c. Thus, while the image remains stationary, the area of projection oscillates to accomplish effective blending.

Considering the system in greater detail, with reference to FIG. 1, the composite picture on the view screen S is provided in two components. Specifically, the background area B receives a low resolution image from a background projector 12, while the inset area F receives a high resolution image from the inset projector 14 (lower right). These projectors may generate monochrome or color images. Note that FIG. 1 is not to scale but rather projection lines and cones are shown with the objective of illustrating the operation of the system.

The background low resolution image provided from the projector 12 passes through an oscillating image combiner 16. That is, as illustrated, a light cone 18 from the projector 12 passes through a transparent portion 20 of the combiner 16. However, at a central location 22 the combiner 16 is opaque, carrying a mirror 24 on the side of the screen S. Consequently, a central portion of the background image from the projector 12 is blocked by the mirror 24 to accommodate the inset image from the projector 14 reflected by the mirror 24 onto the screen S. Essentially, the reflected image is projected as a cone 26, the area of which is displaced on the screen S as indicated by jagged lines 26.

The oscillatory mechanical displacement of the combiner 16 is accomplished through a mechanical link (FIG. 1, a dashed line 28) by an electromechanical vibration drive 30. The drive apparatus is treated in detail below.

As illustrated in FIG. 1, the view screen S presents the dynamic image for a training simulator. That is, a trainee (not shown) is positioned on a viewing platform 32 (upper right) to observe the view screen S. The viewing platform 32 may take any of a variety of structural forms including a simulated aircraft cockpit, and may be fitted with controls and responsive displacement apparatus. Such systems are well known and widely employed in the art. Also, it is well known to provide a display, as on the screen S, that is responsive to control activity by the trainee with respect to a specific terrain or flight path. Thus, as a training exercise, a trainee can experience simulated flight over a particular terrain or even land a specific aircraft at a specific airport.

As illustrated in FIG. 1, a simulator control system 34 (lower left) actuates the viewing platform 32 and also drives a video image generator 36. The projectors 12 and 14 are driven by the video image generator 36 to provide images in correlation with the simulator operation. Various structures are well known that are capable of performing the functions of the projectors 12 and 14 along with the simulator control system 34 and the video image generator 36. That is, as indicated above, simulator structures are well known for providing dynamic composite images incorporating a wide field, low resolution background image and a high resolution, small field of view inset image.

Although the simulator control system 34 is shown connected to the vibration drive 30, operation of the vibration drive 30 is substantially independent of other elements in the operating system. That is, the vibration drive 30 simply oscillates the combiner 16 in an orbital pattern. The drive will now be considered in detail.

Figure 3:
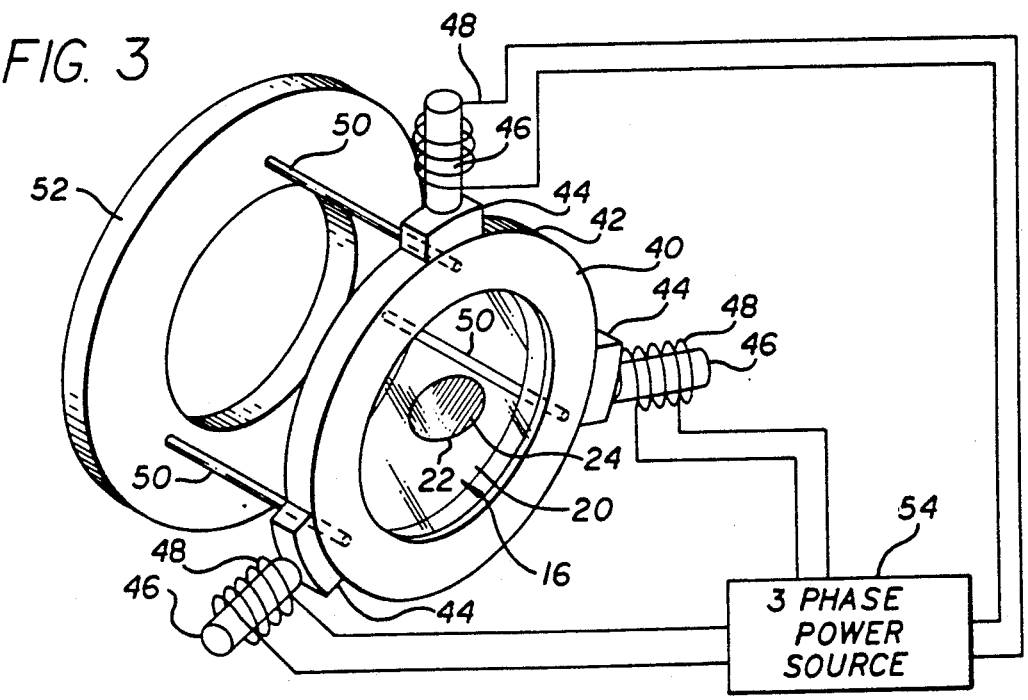
FIG. 3 is a perspective view of a component portion of the system of FIG. 1.

As indicated above, the combiner 16, illustrated in FIG. 3, includes an annular transparent portion 20 surrounding an opaque mirror 24. The combiner 16, of disk configuration, is fixed in an annulus 40 defining an exterior circular surface 42 to which magnetic shoes 44 are affixed, radially spaced 120 degrees apart. Radially aligned with each of the shoes 44 is an electromagnet specifically including an armature 46 and a coil 48. Air gaps are provided between each of the shoes 44 and associated armatures 46 to accommodate orbital motion by the annulus 40 carrying the combiner 16.

Somewhat aligned with each of the shoes 44, flexible mounting posts 50 are affixed to extend parallel to the axis of the annulus 40 to a fixed base ring 52. The posts 50 provide resilient support for the annulus 40, allowing the electromagnetic forces to displace the annulus orbitally, sequentially closing the gaps between the armature 46 and the shoes 44 (see FIG. 2).

To accomplish an orbital motion pattern for the annulus 40, the coils 48 are individually connected to receive phase-related drive power. Specifically, a three-phase power source 54 provides three outputs individually connected to the coils 48. In view of the phase relationship created, a motor action is developed oscillating the annulus 40 (and the combiner 16) in an orbital pattern as described with reference to FIG. 2. Thus, the high resolution, small field of view, inset image is projected on an orbitally oscillating area of the screen S (FIG. 1). With the oscillations above a predetermined frequency, the inset image is visually blended with the wide field, low resolution, background image.

To consider a somewhat alternative and more detailed structure for the combiner 16 (FIG. 1) and vibration drive 30, reference will now be made to FIGS. 4 and 5. Although some structural elements are distinct from the unit represented in FIG. 3, similar components bear the same reference numerals.

Figure 4:
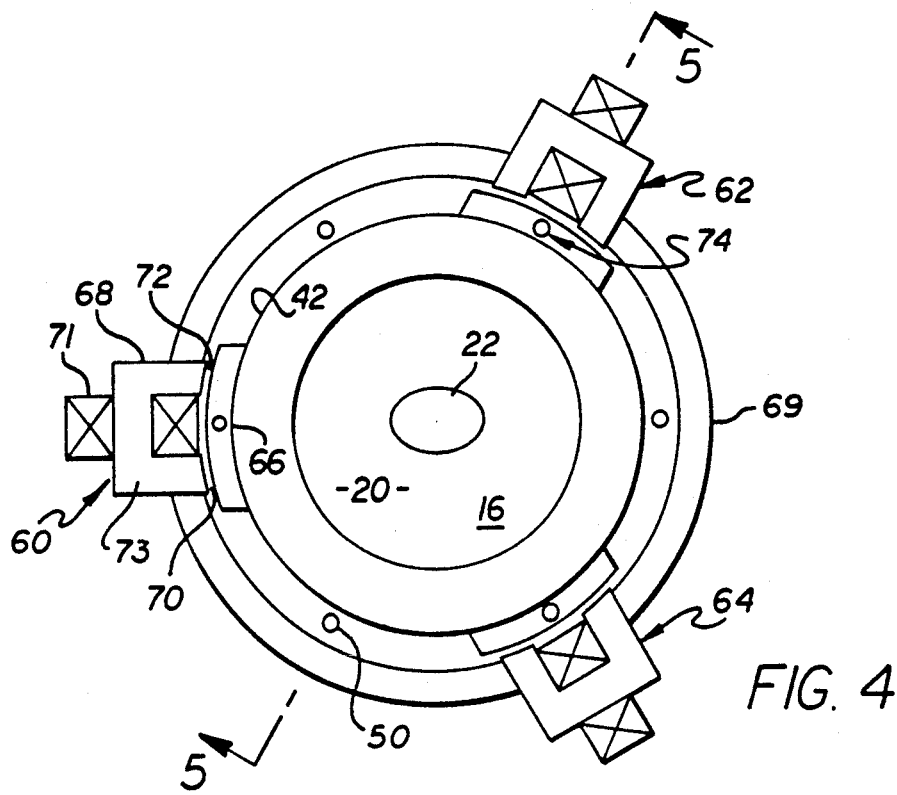
FIG. 4 is a detailed sectional view of a specific form of the component illustrated in FIG. 3.
Figure 5:
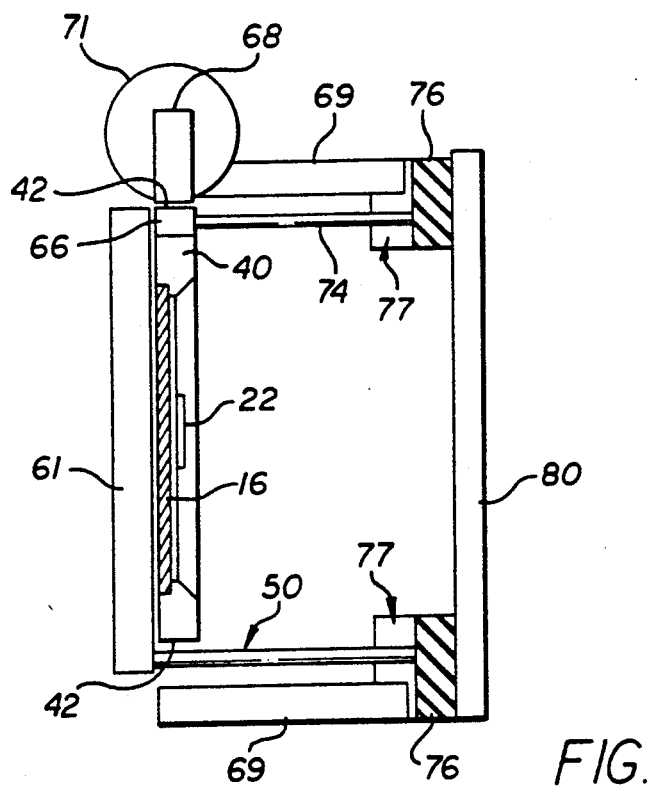
FIG. 5 is another view of the structure of FIG. 4 taken as a cross sectional view through the structure as represented in FIG. 4.

Referring to FIG. 5, the combiner 16, supported behind a counterbalance ring 61 in the annulus 40 to be actuated by three similar electromagnetic structure 60, 62, and 64 (FIG. 4). The structures extend radially from the annulus 40, spaced apart by 120 degrees. Exemplifying the three structures 60, 62, and 64, the structure 60 will be considered in greater detail. Specifically, a shoe 66 of electromagnetic material is curved to mate with the curved exterior curved surface 42 (FIG. 5) of the annulus 40. The shoe 66 may be affixed to the annulus 40 by various techniques including bonds or mechanical fasteners.

The shoe 66 is separated from a "horseshoe" shaped armature 68 (FIG. 4) by air gaps 70 and 72 to accommodate magnetic drive displacement. The armature 68 is energized by a coil 71 coaxial with the base 73 of the armature.

The combiner 16 in the annulus 40 (FIG. 5) is carried by support rods 74 affixed to the shoes 66. Note that a support member 69 is provided for the structures 60, 62, and 64. The rods 74 extend axially parallel to the combiner 16 and are affixed to a mounting ring 77 (FIG. 5). Elastomeric mounts 76 are affixed between the mounting ring 77 and a support ring 80 (FIG. 5) that is in turn affixed to a rigid frame structure (not shown). The mounts 76 may be formed of a rubber-like material affording resilient axial displacement of the entire assembly which activates the counterbalance 61 (FIG. 5, left). The counterbalance 61 is carried on posts 50 that are radially offset from the rods 74 and from each other. The counterbalance 61 and mounts 76 prevent vibration energy from reaching the support ring 80 and the mounting structure.

The structure of the mounting ring 77, the support rods 74, and the composite structure of the combiner 16 along with the counterbalance ring 61 and its supporting posts 50, are designed to vibrate in resonance at the drive frequency. That is, the structure is designed to vibrate the combiner 16 only in the plane of the combiner and with mechanical resonance at the drive frequency. Accordingly, the rods 74 act as cantilevered springs working against the mass of the combiner 16, its mounting structure 77 (including the ring 61) and the drive hardware. Essentially, the vibrating structure is tuned, as by varying the length of the rods 74 and 50 to resonate at drive frequency. As a consequence, power demands of the drive are substantially reduced. As indicated above, the drive frequency must be quite high, e.g. 210 Hertz, for effective blending and to minimize beat frequencies with display refresh rates, normally about 60 Hertz.

Considering the overall operation of the system in a simulator environment, reference will now initially be made to FIG. 1. Recapitulating, the screen S displays a wide field, low resolution background image on an area B that surrounds an area F displaying a high resolution, small field of view, inset image. From the viewing platform 32, the field of vision of a trainee is substantially captured by the view screen S. In a simulator configuration, the viewing platform 32 incorporates controls and physical response apparatus as well known in the art, for example, to accommodate the simulation of actual flight.

The display on the screen S is responsive to a predetermined program of flight along with control manipulations performed by the trainee on the platform 32. The simulator control system 34 is programmed with terrain data and operates responsively to control actions at the viewing platform 32. Accordingly, the control system 34 provides basic computer graphics data to the video image generator 36 enabling the provision of the background image data to the projector 12 and the inset image data to the projector 14.

Responsive to the received data, the background projector 12 provides a projection cone 18 impinging on the screen S to carry the background image. As indicated, the light of the cone 18 passes through a transparent portion 20 of the combiner 16; however, is blocked at the central opaque portion or location 22. Consequently, a void is defined in the background image coinciding to the inset area F.

The detail inset projector 14 projects the inset image to the mirror 24 which is coincident with the opaque location 22 on the combiner 16. Consequently, the image is reflected as illustrated by the cone 26 to fill the inset area F. Blending of the background and inset images is accomplished by orbital oscillatory motion of the inset area F in relation to the background area B as illustrated in FIG. 2. Again, it is important to recognize that the area is displaced by moving the border line between the two images, and not by actually moving the total inset image.

The area of display displacement is accomplished by the vibration drive 30 moving the entire combiner 16 in an orbital pattern. The motion has relatively little effect on the background cone 18 due to the transparent portion 20. However, the moving edges of the mirror 24 result in the inset image variously encroaching on the background image in the orbital oscillatory pattern as described. The result is an effective visual blending for the trainee at the viewing platform 32. As indicated, the vibration of the combiner 16 at resonant frequency economizes the power demands of the system.

As another consideration, by incorporating passive damping techniques, e.g. the counterbalance ring 61 and elastomeric mounts 76, vibration is reduced through matching resonant mass/spring combinations of the combiner and counterbalance. This combination behaves like a tuning fork where the two fork arms vibrate while the base (handhold) remains stationary. That is, the mass/spring combination counterbalance is excited by any reaction forces on the combiner 16 which in turn induces a counter force to the exciting force. The unit accomplishes relatively light weight and stability as a result of the counterbalance and elastomeric vibration isolation.

In view of the above explanations and descriptions, it will be apparent that the system of the present invention enables an effective field of view display as for use in training simulators. Also, the system provides effective blending of images with economy and durability. In that regard, recognizing the significance of various key aspects of the system, it is to be understood that a wide variety of techniques and apparatus may be employed in accordance with the present invention depending on the objectives, the structures, and the operating formats. Consequently, the scope hereof is deemed to be appropriately determined by the claims as set forth below.

We claim:

1. An area of interest display system wherein area of interest imagery of relative great detail and resolution is displayed in the spatial position of the foveal region of the eye of an observer and background imagery of relatively lesser detail and resolution is displayed about the area of interest imagery, comprising:

first display means for projecting said area of interest imagery;

second display means for projecting said background imagery and defining an area to receive said area of interest imagery;

means for combining said area of interest imagery and said background imagery whereby said area of interest imagery is set in said area to receive said image; and means for oscillating said image boundary for said area of interest imagery in relation to said background imagery.

2. A graphics system for providing color image displays including a low resolution, wide field background and a contained high resolution, area of interest, said system comprising:

means for projecting at least one low resolution wide field, color component for an image display and defining an area of interest;

means for projecting at least one high resolution color component for filling said area of interest in said image display;

means for combining said low resolution wide field color component and said high resolution color component for said display; and means for imparting a relative oscillating motion between said color components.

3. A graphics, system according to claim 2 wherein said means for combining comprises a display screen.

4. A graphics system according to claim 2 further including means for variously positioning said area of interest as contained in said image display.

5. A graphics system according to claim 4 further including a viewing platform means to which said means for variously positioning is slaved.

6. A system according to claim 2 further comprising video means to actuate said means for providing color components in sequence for a dynamic display.

7. A graphics system according to claim 2 wherein said means for imparting a relative oscillating motion between said projected images includes a mirror for reflecting one of said images and means for imparting an oscillating motion to said mirror.

8. A graphics system according to claim 2 wherein said means for combining comprises a display screen for receiving said projected color components.

9. A process for providing color image displays including a low resolution, wide field background and a contained high resolution, area of interest, said process comprising the steps of:

projecting at least one low resolution, wide field color component for an image display;

projecting at least one high resolution, color component for said area of interest in said image display;

combining said color components to provide said image display; and imparting a relative oscillating motion between said color components in said display image.

* * * * *